(12) United States Patent
Seppälä

(10) Patent No.: US 8,640,173 B2
(45) Date of Patent: Jan. 28, 2014

(54) SIGNALLING OF CELL ID IN DIGITAL MOBILE BROADCAST SERVICE GUIDE FOR LOCALIZED BROADCASTING

(75) Inventor: Martta Seppälä, Mt. View, CA (US)

(73) Assignee: Nokia Corporation, Espoo (FI)

( * ) Notice: Subject to any disclaimer, the term of this patent is extended or adjusted under 35 U.S.C. 154(b) by 1288 days.

(21) Appl. No.: 11/470,504

(22) Filed: Sep. 6, 2006

(65) Prior Publication Data

US 2007/0055990 A1 Mar. 8, 2007

Related U.S. Application Data

(60) Provisional application No. 60/714,260, filed on Sep. 7, 2005.

(51) Int. Cl.
*H04N 7/16* (2011.01)

(52) U.S. Cl.
USPC .............. 725/62; 725/39; 725/48; 455/414.1; 455/414.3; 455/456.3

(58) Field of Classification Search
USPC ........... 455/445, 414.1, 414.4, 456.3; 725/39, 725/44, 62
See application file for complete search history.

(56) References Cited

U.S. PATENT DOCUMENTS

| | | | |
|---|---|---|---|
| 5,519,760 A | 5/1996 | Borkowski et al. | |
| 5,988,078 A * | 11/1999 | Levine | 715/721 |
| 6,305,018 B1 * | 10/2001 | Usui et al. | 725/49 |
| 6,785,904 B1 * | 8/2004 | Franken et al. | 725/54 |
| 7,254,388 B2 | 8/2007 | Nam et al. | |
| 2002/0050927 A1 | 5/2002 | De Moerloose et al. | |
| 2003/0013425 A1 | 1/2003 | Nee | |
| 2004/0111746 A1 * | 6/2004 | Hoang | 725/54 |
| 2004/0160909 A1 | 8/2004 | Sheynblat | |
| 2004/0192189 A1 | 9/2004 | Yuhara | |
| 2004/0192267 A1 * | 9/2004 | Kettunen et al. | 455/414.1 |

(Continued)

FOREIGN PATENT DOCUMENTS

| | | |
|---|---|---|
| EP | 1 180 863 A2 | 2/2002 |
| EP | 1 420 599 A1 | 5/2004 |

(Continued)

OTHER PUBLICATIONS

TIA/EIA-41-D Location Services Enhancements, 3rd Generation Partnership Project 2, Mar. 2004, pp. 1-234, 3GPP2.

(Continued)

*Primary Examiner* — Allahyar Kasraian
(74) *Attorney, Agent, or Firm* — Ditthavong Mori & Steiner, P.C.

(57) ABSTRACT

Provided are apparatuses and methods for providing a program or service transmission with associated ESG fragment(s) to a receiver within a designated location. Parameter, elements or sub-elements may be included in a service guide or other data fragment indicating the location within which the program, service and corresponding ESG fragment(s) may be broadcast. For example, a Cell ID may be indicated as an element or sub-element in an ESG fragment to indicate the location in which a program or service may be broadcast. Also, Cell IDs may be grouped to indicate a larger region in which to broadcast a program or service and corresponding ESG fragment(s) in a service guide.

32 Claims, 6 Drawing Sheets

(56) References Cited

U.S. PATENT DOCUMENTS

| | | | |
|---|---|---|---|
| 2004/0250280 A1* | 12/2004 | Allport | 725/56 |
| 2005/0233705 A1* | 10/2005 | Vare et al. | 455/70 |
| 2005/0289589 A1* | 12/2005 | Vermola | 725/35 |
| 2006/0050672 A1 | 3/2006 | Shim et al. | |
| 2006/0123099 A1* | 6/2006 | Paila et al. | 709/219 |
| 2006/0148467 A1* | 7/2006 | Kreitzer et al. | 455/426.1 |
| 2006/0253560 A1* | 11/2006 | Aaltonen | 709/223 |
| 2009/0204997 A1* | 8/2009 | Xu et al. | 725/54 |

FOREIGN PATENT DOCUMENTS

| | | | | |
|---|---|---|---|---|
| EP | 1 119 211 B1 | 11/2004 | | |
| GB | 2 396 228 A * | 6/2004 | | G06F 17/30 |
| KR | 20040101009 A | 12/2004 | | |
| WO | WO 97/24010 A1 | 7/1997 | | |
| WO | WO 01/99459 A1 | 12/2001 | | |
| WO | WO 03/045064 A1 * | 5/2003 | | H04N 7/24 |
| WO | WO 2004/054295 A1 | 6/2004 | | |
| WO | WO 2004/056096 A1 * | 7/2004 | | H04N 5/445 |
| WO | 2005041064 A1 | 5/2005 | | |
| WO | WO 2010145485 A1 * | 12/2010 | | |

OTHER PUBLICATIONS

Service Guide for Mobile Broadcast Services, Draft Version 1.0, Aug. 18, 2005, Open Mobile Alliance, OMA-TS-BCAST_ServiceGuide-V1_0_020050818-D, Open Mobile Alliance, Ltd.

Office Action for corresponding Russian Patent Application No. 2008107409/09 (008020), Jul. 1, 2009, pp. 1-8.

Bulander, R., et al.: Comparison of Different Approaches for Mobile Advertising. The Second IEEE International Workshop on Mobile Commerce and Services, 2005, XP10883196, pp. 1-9.

European Office Action for corresponding EP Application No. 06795413.1-2223, Nov. 4, 2009, Europe.

Supplementary European Search Report, PCT/IB2006002427, Jul. 24, 2009, pp. 1-7.

Office Action of the Corresponding Russian Application, No. 2008107409/09(008020), dated Jan. 20, 2010. pp. 1-14.

* cited by examiner

SIGNALLING OF CELL ID IN DIGITAL MOBILE BROADCAST SERVICE GUIDE FOR LOCALIZED BROADCASTING

CROSS REFERENCE TO RELATED APPLICATIONS

This application claims the benefit of U.S. Provisional Application No. 60/714,260, which was filed Sep. 7, 2005, and which is incorporated herein by reference.

FIELD

Embodiments of the invention relate generally to communications networks. More specifically, embodiments of the invention relate to localized mobile broadcast service guides among broadcast communications systems.

BACKGROUND

Digital broadband broadcast networks enable end users to receive digital content including video, audio, data, and so forth. Using a mobile terminal, a user may receive digital content over a wireless digital broadcast network. Digital content can be transmitted wirelessly using packetized transmission, such as provided for example by the MPEG-TS (Moving Pictures Experts Group Transport Stream) standard.

There are several broadcast services available. For example, 3GPP (Third-generation Partnership Project) provides broadcast services in Global System for Mobile Communications/Wideband CDMA (GSM/WDCMA) and 3GPP2 (Third-generation Partnership 2) provides broadcast services in CDMA2000. The work item in GSM/WCDMA is Multimedia Broadcast and Multicast Service (MBMS). The work item in CDMA2000 is Broadcast and Multicast Service (BCMCS).

In addition to MBMS of 3GPP and BCMCS of 3GPP2, Open Mobile Alliance (OMA) BCAST, a sub-working group for mobile broadcast services, provides OMA BCAST services such as content protection, service guides, program guides, or transmission scheduling for an underlying broadcast service such as MBMS, BCMCS or digital broadband broadcast systems such as DVB-H (Digital Video Broadcasting handheld).

In a mobile communication system, the location at which a user is positioned may change. Information useful to a user in a designated location may be tailored to that location. For example, weather or traffic information may differ based on location and a user may desire information on, for example, weather of a city where the user is located. However, if the user moves to a second city, the user may then wish to receive weather information in the second city rather than the first city. Also, information pertaining to the location of a subscriber terminal should be accurately provided in a standardized fashion and should not depend on the communication being used, i.e., whether the terminal is using OMA BCAST, MBMS, BCMCS, or any other communication system, such as DVB-H. The communication system should identify the location of the user so that appropriate information may be accurately delivered to the user.

Hence, there is a need to provide a standardized method for providing localization information across varying communication systems.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a transmitter is provided for transmitting program or service data and corresponding ESG fragment(s) to a subscriber terminal or receiver within a predetermined location. For example, a subscriber terminal or receiver may be located within a Cell ID area to which the transmitter may transmit data. The subscriber terminal or receiver may receive a data transmission and corresponding ESG fragments within the location.

In another example, a receiver is provided for receiving a data transmission from a transmitter. The transmission may be broadcast or transmitted to a predetermined location or region. The location or region may correspond to a Cell ID or group of Cell IDs. When the receiver is within the location or region indicated by the Cell ID or group of Cell IDs, the receiver may receive the program or service being transmitted and corresponding ESG fragment(s).

In another example, a method for transmitting data to a predetermined location is provided. In this example, location information is received and processed. The location information may be matched to a corresponding Cell ID, and a data transmission may be transmitted to a location corresponding to the Cell ID.

BRIEF DESCRIPTION OF THE DRAWINGS

A more complete understanding of embodiments of the invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. Other embodiments may be utilized and structural and functional modifications may be made without departing from the scope and spirit of the invention.

Figure 1:
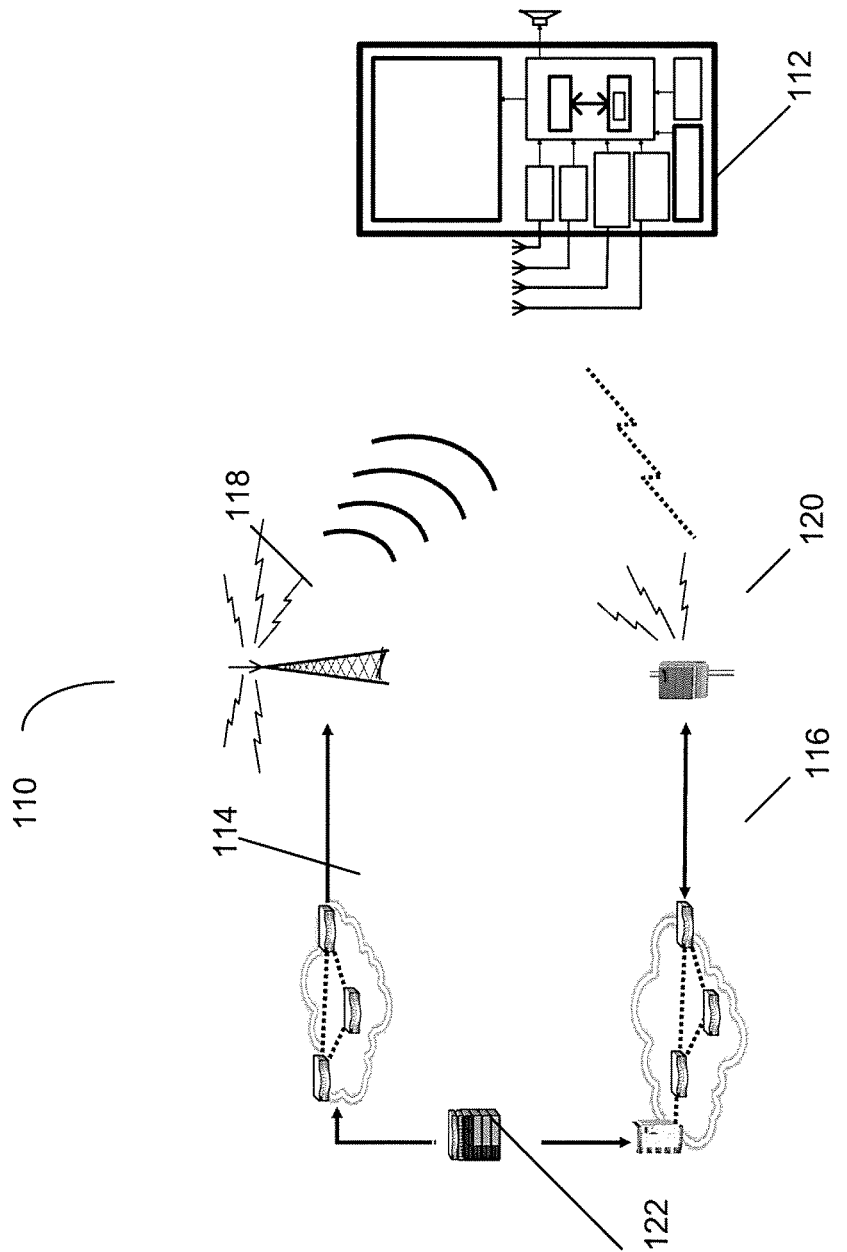
FIG. 1 illustrates a block diagram of a wireless communication system in which various aspects of the invention may be implemented.

Embodiments of the invention may be utilized across a broad array of networks and communication protocols. FIG. 1 illustrates an example of a wireless communication system 110 in which systems and methods in accordance with the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112.

The several service providers may include, but are not limited to, one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
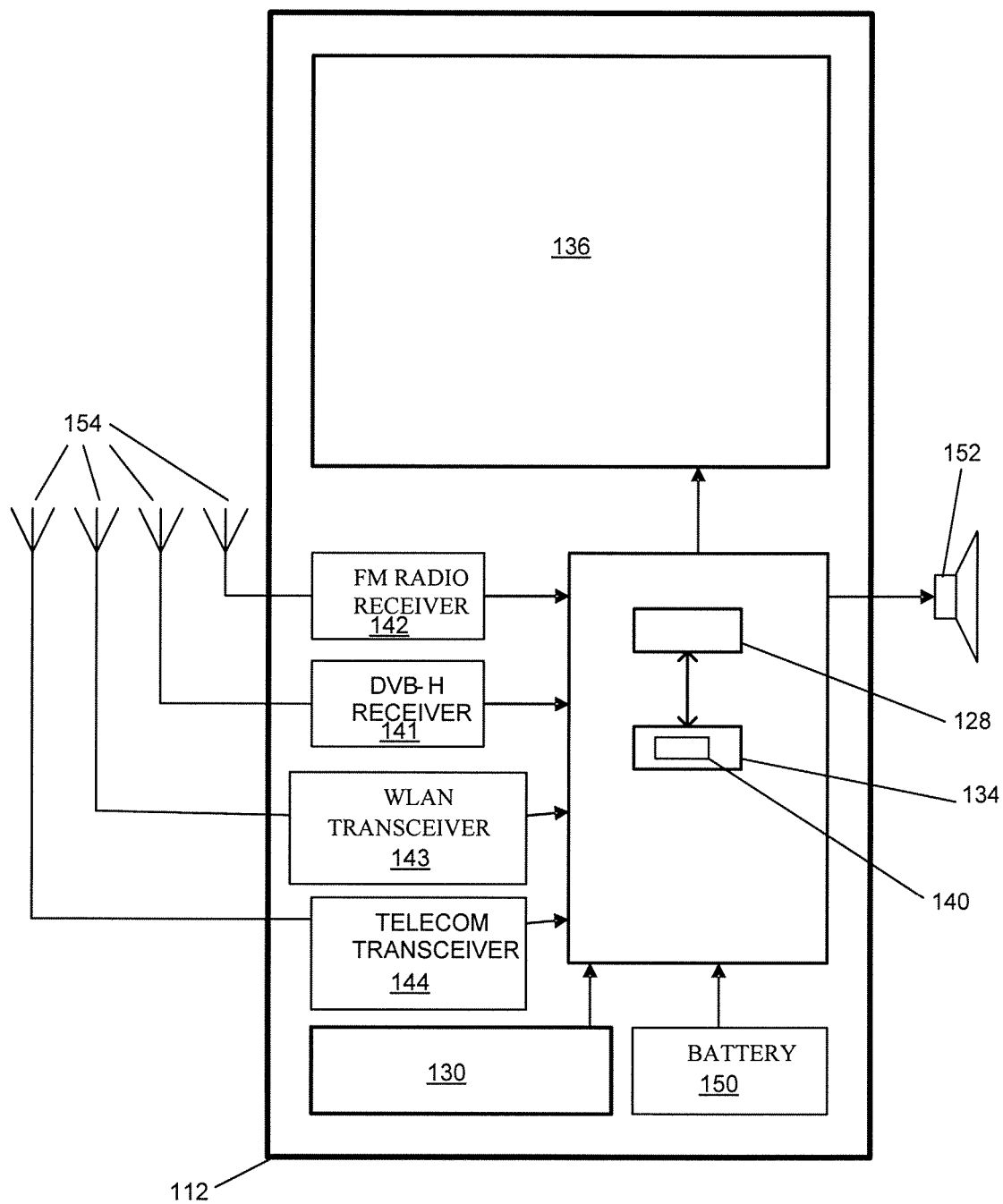
FIG. 2 illustrates a block diagram of a mobile terminal in accordance with an aspect of the invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200 50-kbit/s audio program channels or 50 200-kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Information regarding available services may be transmitted to a subscriber terminal or receiver within an Electronic Service Guide (ESG). Thus, an ESG may enable a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks including wireless digital broadband broadcast networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted by using ALC and FLUTE protocols. Data is often transmitted through the Internet addressed to a single user. It can, however, be addressed to a group of users, commonly known as multicasting. In the case in which the data is addressed to all users it is called broadcasting.

ESG fragments include metadata and descriptions of services or content and are instantiated using a syntax such as XML. Identifiers are used to identify the ESG fragments regarding various attributes of the ESG fragments. However, these identifiers often create large overhead due to their large size. For example, if a Uniform Resource Identifier (URI) is used as an identifier, the overhead is large and unwieldy at 255*8. Therefore, short 32-bit integer identifiers have been used to identify ESG fragments. However, identifiers must be unique for each corresponding ESG fragment. Administration of 32-bit integer identifiers would need to be globally centralized in order to provide the necessary uniqueness of the identifier because ESG fragments from different sources may be identified by non-unique identifiers. For example, as ESG fragments are often aggregated from different sources, each source may not use a standard identifier scheme such that there may be conflicts of identifiers among different sources. In this example, different sources may use the same identifier for corresponding ESG fragments from the different sources. When the different ESG fragments from different source with the same identifier are received at the aggregator, conflicts will arise.

Figure 3:
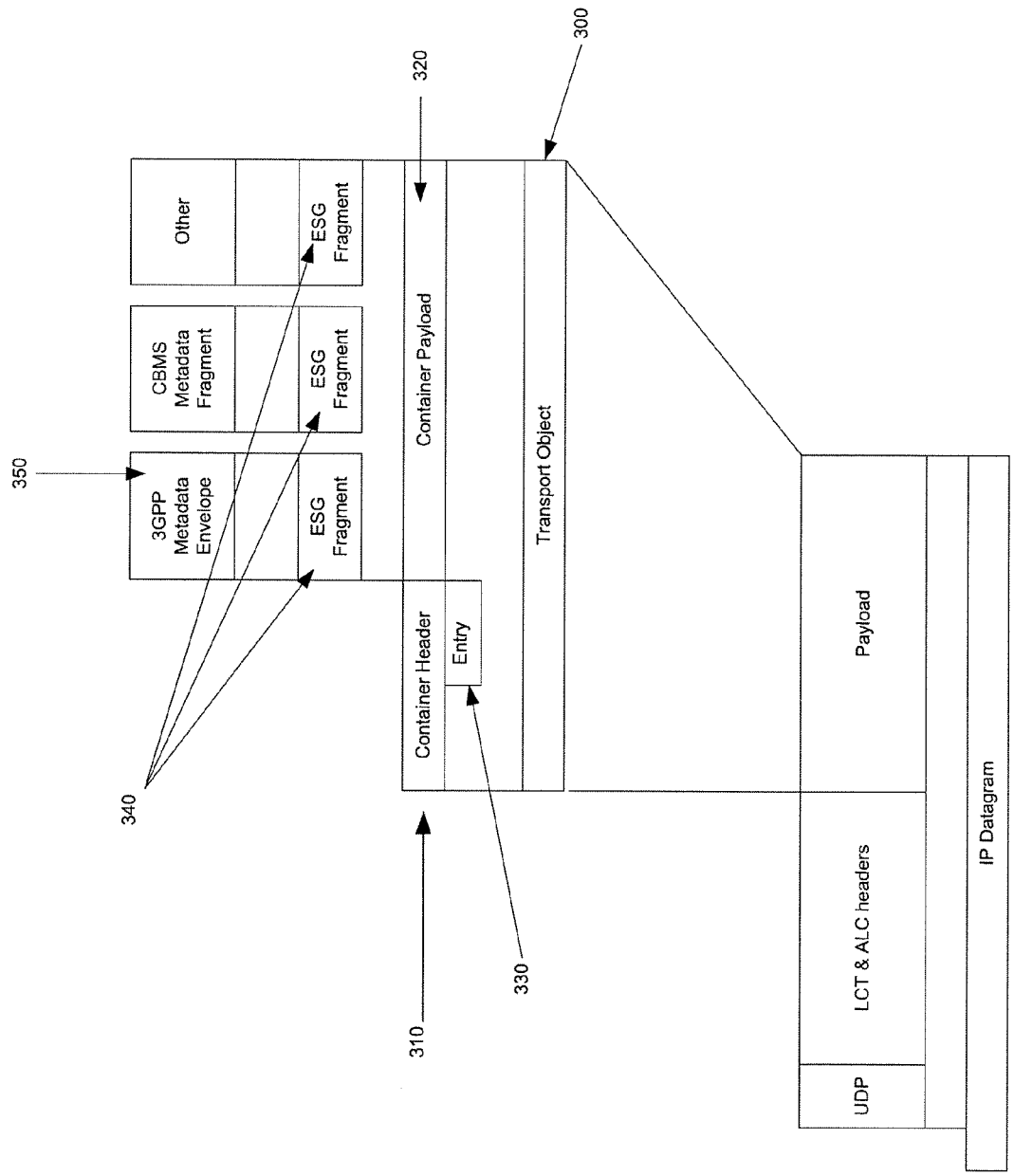
FIG. 3 illustrates a schematic diagram of an example transport object in accordance with an aspect of the invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single transport object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In an embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute, or negate the need, for additional metadata to be located in the header 310 in relation to that particular ESG fragment.

Information corresponding to the location of the receiver may be included in a transmission. The location information may be included, for example, in an ESG fragment, a content fragment or any other data transmission such as in a separate location fragment. The information may include various parameters including a parameter or element corresponding to a broadcast area. As one example, information on the area in which the broadcast transmission includes may be contained in an element "broadcast_area". The broadcast_area element may contain sub-elements that may provide additional pertinent information that may further define the broadcast area. As an example, the broadcast_area element may contain a target_area sub-element that may be used to define the area of distribution in which the broadcast transmission may be provided. In one example, the target_area sub-element is a sub-element of the broadcast_area element which may contain other sub-elements in addition to the target-area subelement. Sub-elements may also include other sub-elements. For example, the target_area sub-element of the Broadcast_area element may contain a sub-element describing the shape of the area in which the broadcast transmission may be provided. The shape sub-element may indicate any shape desired, for example, a square, rectangle, triangle, circle oval, etc. As a further example, the target_area sub-element may further include a country code sub-element which may provide a code corresponding to a particular designated country (e.g., a "cc" sub-element). For example, a three digit number may be provided as the country code. As one example, the cc sub-element is "355" corresponding to the country of Albania. It should be recognized that this is merely an example to illustrate the country code parameter but any number or code may be used for any desired country.

The target_area sub-element may further include a name sub-element that may indicate the name of a geographic area. For example, the target_area sub-element may contain a "name_area" sub-element that may describe the name of a city (e.g., the name_area sub-element may be "Seoul" to describe a city in South Korea). In addition, the target_area sub-element may contain a sub-element describing the zip code of the location if the location has an associated zip code. In this example, the target_area sub-element may contain a zip_code sub-element of an integer type that provides the zip code of the broadcast area. The target_area subelement may comprise one or more of the sub-elements: shape, cc, name_area and zip_code. They may be used separately or in combination for defining the broadcast area.

In addition to the target_area sub-element to describe the physical area in which the broadcast may be provided, the broadcast area descriptor or element may also contain a parameter or sub-element for describing the horizontal accuracy of the provided broadcast area. For example, a hor-acc sub-element or parameter may be provided within the broadcast_area element or descriptor that may provide the horizontal accuracy, if desired, which may be used in combination with sub-elements of the target_area subelement for defining the broadcast area.

In another example of the present invention, the parameter or element describing the location of the broadcast transmission (e.g., the broadcast_area parameter or target_area parameter or sub-element or their combination) may further include a parameter or sub-element for providing a Cell ID associated with the cellular network of the broadcast transmission. The Cell ID may correspond to the area where a mobile terminal, for example, may receive a transmission and may position a user at a particular location. In some areas, cells may be relatively small, for example, a half mile or less in radius. In other areas, the cells may be larger, for example, up to five miles in radius. The size of cells may depend on many factors. For example, in more urban areas, the cell radius may be smaller than in rural areas.

The cell may be associated with a Cell ID that may be described in the broadcast transmission. In this example, the Cell ID is included as a sub-element in the location information. In the above example, a target_area parameter or sub-element is provided for describing and providing an area in which a broadcast transmission is provided (i.e., the target area in which to distribute the transmission). The target_area parameter may include a cell_ID parameter or sub-element that describes the Cell ID of the cell corresponding to the target area. Also, the Cell IDs may be contained in a group that may define a specified location. For example, a plurality of Cell IDs of different cells may be grouped together to form a Cell ID group that may be described in a parameter or sub-element in a location parameter or element. The Cell ID group may describe a larger related area than, for example, a single Cell ID sub-element or parameter.

The following TABLE 1 provides examples of descriptors, elements, parameters, or sub-elements that may provide location information in a mobile broadcast system. Such information may be carried in ESG fragments.

TABLE 1

| Name | Type | Category | Cardinality | Description |
| --- | --- | --- | --- | --- |
| Broadcast_area | E1 | O | 0 ... 1 | Broadcast area to include location information Subelements: target_area hor_acc |
| target_area | E2 | O | 0 ... N | Target area to distribute Subelements: shape cc name_area zip-code Cell_ID Cell_Group_ID |
| Shape | E3 | O | 0 ... 1 | Shapes to represent geographic area being described |
| Cc | E3 | O | 0 ... 1 | Country code, e.g., 1–3 digits |
| name_area | E3 | O | 0 ... 1 | Geopolitical name of area |
| zip_code | E3 | O | 0 ... 1 | Zip code |
| hor_acc | E2 | O | 0 ... N | Horizontal accuracy in meters |
| Cell_ID | E2 | O | 0 ... N | Network Cell ID |
| Cell_Group_ID | E2 | O | 0 ... N | Group of cellular network Cell IDs |

Where the type can be an Element (E), an Attribute (A), a first level sub-element (E1), a second level sub-element (E2) or a third level sub-element (E3) and the category can be optional (O) or preferred/mandatory (M).

Figure 4:
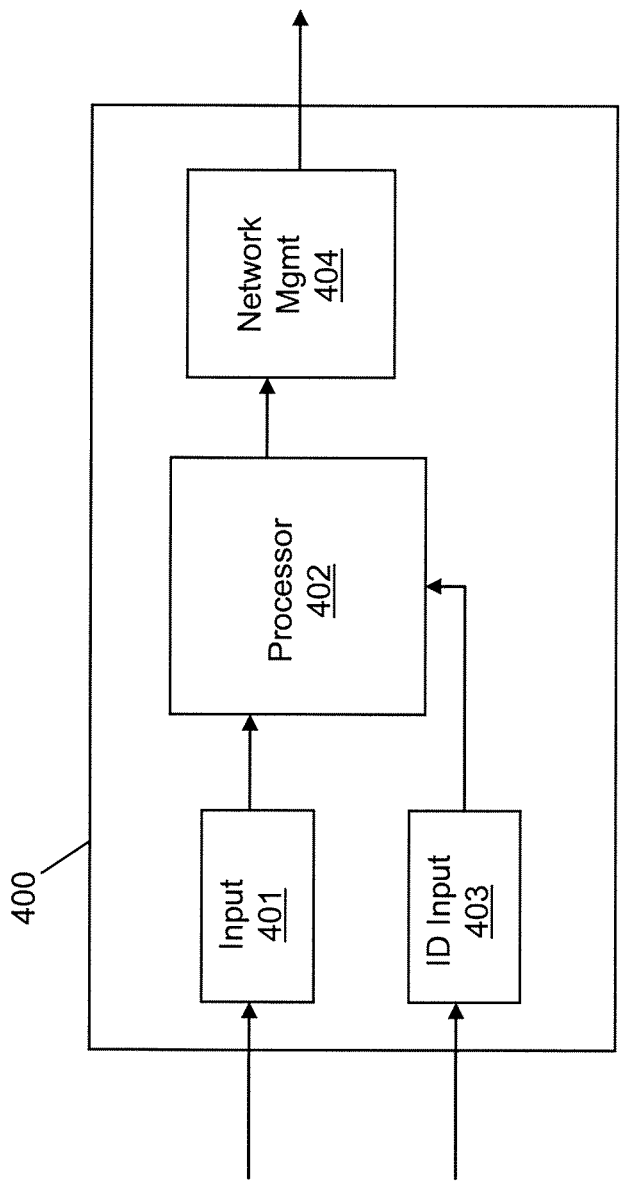
FIG. 4 is a partial block diagram illustrating one example of a transmitter for transmitting broadcast data to a location in which one or more illustrative embodiments of the invention may be implemented.

One or more of the parameters, elements, or sub-elements may be carried in an ESG fragment as described above. In one example of the invention, a transmitter is provided for providing a broadcasting service or program to a particular location based on location information received in an ESG fragment. FIG. 4 is a partial block diagram illustrating one example of a transmitter for transmitting broadcast data to a location. In this example, the transmitter 400 contains an input 401 for receiving data from a remote source. The received data may include information for an ESG fragment that corresponds to an associated program or service. In addition, the program or service may be broadcast to a particular location.

As the example of FIG. 4 illustrates, the transmitter 400 may receive the location parameter at a location ID input 403. The location parameter may be, for example, a parameter that describes an area in which a transmission is to be allocated. As one example, the location parameter is a Cell ID which corresponds to a cell in which the transmission is to be broadcast. The transmitter 400 may receive the location parameter at the location ID input 403 and may process the location parameter at the processor 402. Based on the location parameter received at the location ID input 403, the transmitter may transmit a signal to a network management module 404 which can allocate the associated program or service in the network to the indicated location (e.g., the Cell ID). In the allocation of a program or service, the programs or services may be provided with access parameters such that they may be received in at an indicated location. The transmitter 400 may thus output the program or service over the allocated network to the subscriber terminal or receiver (not shown).

The network management module 404 may alternatively be located anywhere in the network. In another example, the network management module 404 may be a component separate from the transmitter 400. In another example, the network management module 404 may be located within a receiver or subscriber terminal.

Figure 5:
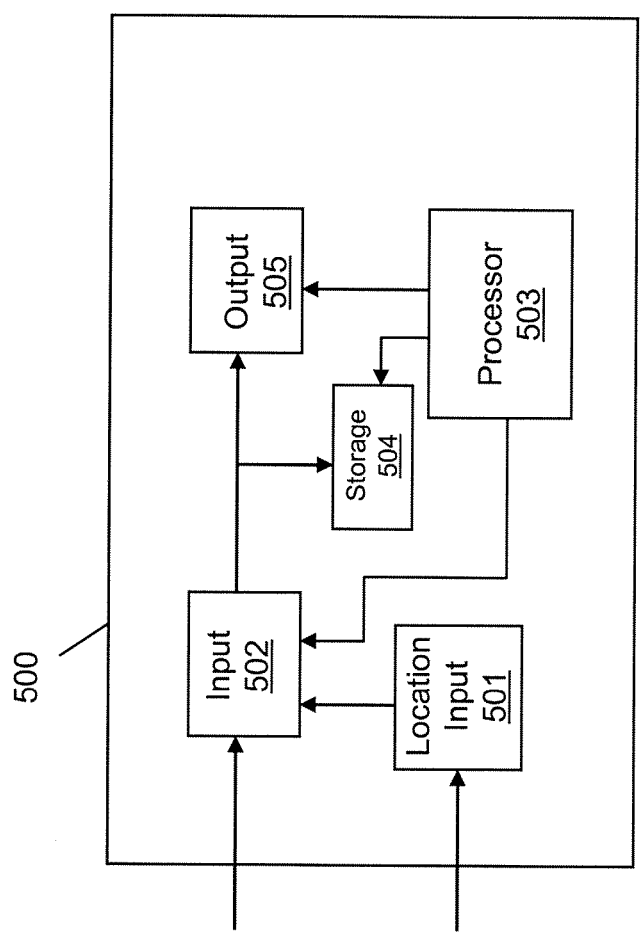
FIG. 5 is a partial block diagram illustrating an example of a receiver or subscriber terminal in which one or more illustrative embodiments of the invention may be implemented.

FIG. 5 is a partial block diagram illustrating an example of a receiver or subscriber terminal. In this example, the receiver 500 contains a location input 501 which receives a signal indicating the location such as the Cell ID. As described above, information on the location may be received and processed at the transmitter for providing programs or services based on the location of the subscriber terminal or receiver. The location information such as a Cell ID may be received at the location input 501. Based on the location input, the processor 503 may control the input of data from the input 502. For example, if the location information received at the location input 501 does not correspond to the location information in the received program or service, then the program or service at the input 502 does not correspond to the location in which the subscriber terminal or receiver is located. In this case, the receiver 500 may not receive the program or service. However, if the location information received at the location input 501 is determined by the processor 503 to match the location information corresponding to the transmission at the input 502, the information may be processed by the processor 503 at the receiver 500. For example, the received transmission may be stored in a memory store 504 or may be output at the subscriber terminal or receiver 500. For example, the information may be displayed at the subscriber terminal or receiver via an output 505.

Figure 6:
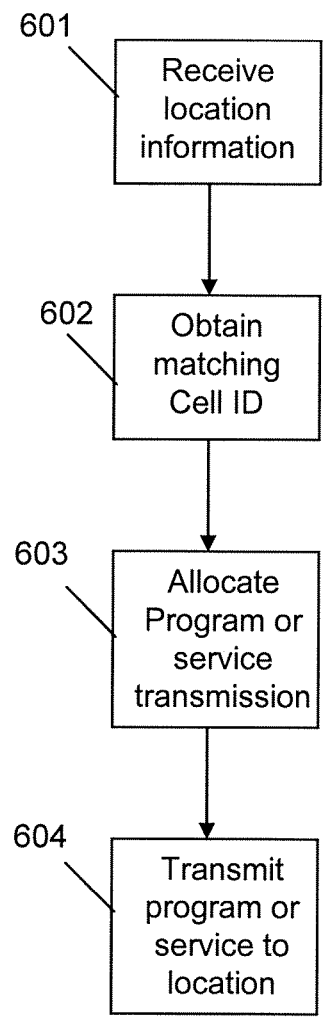
FIG. 6 is a flow chart illustrating an example of defining location in a mobile broadcasting system for program or service transmission in which one or more illustrative embodiments of the invention may be implemented.

FIG. 6 is a flow chart illustrating an example of defining location in a mobile broadcasting system for program or service transmission. In this example, location information is received at a network management module (STEP 601). The network management module may be positioned within the transmitter, receiver or elsewhere within the network. The location information may be any information which can identify a location in which a program or service is to be broadcast. For example, the location information may include zip code information, city or geopolitical name information, etc. The network management module may receive the location information (e.g., zip code) and determine a Cell ID corresponding to the area indicated by the location information. If the location information is a zip code, the network management module may determine a Cell ID corresponding to the zip code area (STEP 602). The program or service to be broadcast and the corresponding ESG fragment(s) are then allocated to the network (STEP 603) to be delivered to the subscriber terminal or receiver in the location indicated by the Cell ID. The program or service and corresponding ESG fragment(s) may thus be transmitted to the proper recipients (STEP 604). The subscriber terminal or receiver receiving the data transmission may also receive the ESG and content of the program or service tailored to the Cell ID location.

For illustration purposes, a zip code may be provided to a network management module. The location identification may be matched to a corresponding Cell ID. The network management module may allocate a program or service corresponding to the location indicated by the Cell ID based on the location identification. Likewise, a subscriber terminal or receiver may receive the location-specific programming and corresponding ESG fragment(s) at the Cell ID.

In another example, several Cell IDs may be combined such that the group of Cell IDs may be described by a group ID (e.g., a Cell_Group_ID). Thus, a program or service may be broadcast within a larger region. Also, the region in which the program or service is provided may correspond to any desired area such as, for example, a city, a geopolitical area or a state.

In yet another example, several Cell Group IDs may be combined such that a group of Cell Group IDs may be described by an element. For example, a Cell Group ID corresponding to Los Angeles may be combined with a Cell Group ID corresponding to San Diego to create a Cell Group ID for "Southern California."

The Cell ID parameters may take many forms depending on the network type. For example, a Cell ID parameter may be renamed to adapt the parameter to the system being used (e.g., BCMCS, MBMS, DVB-H, etc.). The following TABLE 2 provides examples of parameters that may be used based on the system or cellular network being used. Any of these parameters may be mapped to correspond to a standardized format or parameter name.

TABLE 2

| Location parameter | BCMCS | MBMS | DVB-H |
| --- | --- | --- | --- |
| Cell_ID | Cell_ID_3gpp2 | Cell_ID_3gpp | Cell_ID_DVB-H |
| Cell_Group_ID | Cell_Group_ID_3gpp2 | Cell_Group_ID_3gpp | Cell_Group_ID_DVB-H |

Embodiments of the invention may include any novel feature or combination of features disclosed herein either explicitly or any generalization thereof. While embodiments of the invention have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. An apparatus comprising:
   at least one processor; and
   at least one memory including computer program code for one or more programs, the at least one memory and the computer program code configured to, with the at least one processor, cause the apparatus to perform at least the following,
   receive electronic service guide data to be transmitted to a designated geographic location;
   receive one or more parameters corresponding to the designated geographic location, each of the one or more parameters comprising a designation of one of a Cell identification (ID) and a group of Cell IDs;
   allocate one or some portions of the electronic service guide data to be transmitted to one or more cells corresponding to the designation; and
   determine to transmit the allocated electronic service guide data to the one or more cells.

2. The apparatus of claim 1, wherein the one or more parameters are received in an electronic service guide fragment.

3. The apparatus of claim 1, wherein the apparatus is a server, a base station, or a transmitter located between a data casting source and one or more subscriber terminals.

4. The apparatus of claim 1, wherein the apparatus is further caused to:
   receive one or more other parameters each of which comprises a designation of an geographic area defined independently of cells;
   correspond the one or more other parameters to the one or more parameters comprising the designation of one of the Cell identification (ID) and the group of Cell IDs thereby corresponding the area to one or more cells associated with the designation of one of the Cell ID and the group of Cell IDs;
   allocate one or some portions of the electronic service guide data to be transmitted to the one or more cells corresponding to the area; and
   determine to transmit the allocated electronic service guide data to the one or more cells.

5. The apparatus of claim 4, wherein the area is defined by one or more zip codes.

6. The apparatus of claim 1, wherein the allocated electronic service guide data is transmitted only to receivers located in the one or more cells, and the allocated electronic service guide data are tailored for the one or more cells.

7. The apparatus of claim 1, wherein only the allocated portions of the electronic service guide data are transmitted to receivers located in the one or more cells, and the allocated electronic service guide data are tailored for the one or more cells.

8. An apparatus comprising:
   at least one processor; and
   at least one memory including computer program code for one or more programs,
   the at least one memory and the computer program code configured to, with the at least one processor, cause the apparatus to perform at least the following,
   receive one or some portions of electronic service guide data that is set for a designated geographic location, the one or some portions of electronic service guide data being allocated to one or more cells based upon a parameter including one of a Cell identification (ID) and a group of Cell IDs,
   wherein the parameter is in an electronic service guide fragment.

9. The apparatus of claim 8, wherein the apparatus is further caused to determine to display, store, or a combination thereof, the received one or some portions of the electronic service guide data.

10. The apparatus of claim 8, wherein the allocated electronic service guide data is transmitted only to receivers located in the one or more cells, and the allocated electronic service guide data are tailored for the one or more cells.

11. The apparatus of claim 8, wherein only the allocated portions of the electronic service guide data are transmitted to receivers located in the one or more cells, and the allocated electronic service guide data are tailored for the one or more cells.

12. A method comprising:
   receiving at an apparatus electronic service guide data to be transmitted to a designated geographic location;
   receiving at the apparatus one or more parameters corresponding to the designated geographic location, each of the one or more parameters comprising a designation of one of a Cell identification (ID) and a group of Cell IDs;
   allocating one or some portions of the electronic service guide data to be transmitted to one or more cells corresponding to the designation; and
   determining to transmit the allocated electronic service guide data from the apparatus to the one or more cells.

13. The method of claim 12, wherein the parameter comprises a zip code.

14. The method of claim 13, wherein the allocating step comprises:
   allocating one or some portions of the electronic service guide data to be transmitted to one or more cells corresponding to the zip code.

15. The method of claim 14, wherein the transmitting step comprises determining to transmit the allocated electronic service guide data from the apparatus to a geographic area corresponding to the zip code.

16. A method comprising:
   receiving one or some portions of electronic service guide data that is set for a designated geographic location, the one or some portions of electronic service guide data being allocated to one or more cells based upon a parameter including one of a Cell identification (ID) and a group of Cell IDs,
   wherein the parameter is in an electronic service guide fragment.

17. The method of claim 16, further comprising: determining to display, store, or a combination thereof, the received one or some portions of the electronic service guide data.

18. A non-transitory computer-readable storage medium carrying one or more sequences of one or more instructions which, when executed by one or more processors, cause an apparatus to at least perform the following steps:
   receiving electronic service guide data to be transmitted to a designated geographic location;
   receiving one or more parameters corresponding to the designated geographic location, each of the one or more parameters comprising a designation of one of a Cell identification (ID) and a group of Cell IDs;
   allocating one or some portions of the electronic service guide data to be transmitted to one or more cells corresponding to the designation; and
   determining to transmit the allocated electronic service guide data to the one or more cells.

19. The non-transitory computer-readable storage medium of claim 18, wherein the parameter comprises a zip code.

20. The non-transitory computer-readable storage medium of claim 19, wherein the allocating step comprises:
   allocating one or some portions of the electronic service guide data to be transmitted to one or more cells corresponding to the zip code.

21. The non-transitory computer-readable storage medium of claim 20, wherein the transmitting step comprises determining to transmit the allocated electronic service guide data from the apparatus to an area corresponding to the zip code.

22. An apparatus comprising:
   at least one processor; and
   at least one memory including computer program code,
   the at least one memory and the computer program code configured to, with the at least one processor, cause the apparatus to perform at least the following,
   receive location information corresponding to a geographic location in which electronic service guide data is to be transmitted;
   determine a first Cell identification (ID) corresponding to the location information;
   allocate one or some portions of the electronic service guide data to be transmitted to a cell based on the first Cell ID; and
   determine to transmit the allocated electronic service guide data to the cell.

23. The apparatus of claim 22, wherein the apparatus is further caused to:
   determine a second Cell ID; and
   allocate one or some portions of the electronic service guide data to be transmitted to the cell and another cell corresponding to the second Cell ID.

24. The apparatus of claim 22, wherein the location information includes a parameter that comprises a zip code, and the apparatus is further caused to:
   receive the one or some portions of electronic service guide data that is set for the zip code.

25. A non-transitory computer-readable storage medium carrying one or more sequences of one or more instructions which, when executed by one or more processors, cause an apparatus to at least perform the following steps:
   receiving one or some portions of electronic service guide data that is set for a designated geographic location, the one or some portions of electronic service guide data being allocated to one or more cells based upon a parameter including one of a Cell identification (ID) and a group of Cell IDs,
   wherein the parameter is in an electronic service guide fragment.

26. The non-transitory computer-readable storage medium of claim 25, wherein the apparatus is caused to further perform:

determining to display, store, or a combination thereof, the received one or some portions of the electronic service guide data.

27. A method comprising:

receiving location information corresponding to a geographic location in which electronic service guide data is to be transmitted;

determining a first Cell identification (IDS) corresponding to the location information;

allocating one or some portions of the electronic service guide data to be transmitted to a cell based on the first Cell ID; and determining to transmit the allocated electronic service guide data to the cell.

28. The method of claim 27, further comprising:

determining a second Cell ID; and allocating one or some portions of the electronic service guide data to be transmitted to the cell and another cell corresponding to the second Cell ID.

29. The apparatus of claim 27, wherein the location information includes a parameter that comprises a zip code, and the method further comprising:

receiving the one or some portions of electronic service guide data that is set for the zip code.

30. A non-transitory computer-readable storage medium carrying one or more sequences of one or more instructions which, when executed by one or more processors, cause an apparatus to at least perform the following steps:

receiving location information corresponding to a geographic location in which electronic service guide data is to be transmitted;

determining a first Cell identification (ID) corresponding to the location information;

allocating one or some portions of the electronic service guide data to be transmitted to a cell based on the first Cell ID; and determining to transmit the allocated electronic service guide data to the cell.

31. The non-transitory computer-readable storage medium of claim 30, wherein the apparatus is caused to further perform:

determining a second Cell ID; and allocating one or some portions of the electronic service guide data to be transmitted to the cell and another cell corresponding to the second Cell ID.

32. The non-transitory computer-readable storage medium of claim 30, wherein the location information includes a parameter that comprises a zip code, and the apparatus is caused to further perform:

receiving the one or some portions of electronic service guide data that is set for the zip code.

\* \* \* \* \*